US006999908B2

(12) United States Patent
Yang et al.

(10) Patent No.: US 6,999,908 B2
(45) Date of Patent: Feb. 14, 2006

(54) HEXAHEDRAL FINITE ELEMENT MODELING METHOD FOR CONTROLLING ELEMENT SIZE AND STORAGE MEDIUM THEREFOR

(75) Inventors: Dong Yol Yang, Daejon (KR); Young Kyu Lee, Daejon (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 907 days.

(21) Appl. No.: 10/054,668

(22) Filed: Jan. 22, 2002

(65) Prior Publication Data

US 2002/0120430 A1 Aug. 29, 2002

(30) Foreign Application Priority Data

Feb. 23, 2001 (KR) ................................. 2001-9360

(51) Int. Cl.
*G06F 17/50* (2006.01)
(52) U.S. Cl. ............................................ 703/1; 716/20
(58) Field of Classification Search ................ 703/1, 703/2, 5, 7; 345/419, 420; 716/20
See application file for complete search history.

(56) References Cited

U.S. PATENT DOCUMENTS 5,740,342 A * 4/1998 Kocberber .................. 345/420
5,768,156 A * 6/1998 Tautges et al. ................ 716/20
5,819,070 A * 10/1998 Sasaki .......................... 703/13
6,573,892 B1 * 6/2003 Yang et al. .................. 345/421
6,804,635 B1 * 10/2004 Dhondt ........................... 703/2
6,876,956 B1 * 4/2005 Cirak et al. .................... 703/2

* cited by examiner

Primary Examiner—Albert W. Paladini
(74) Attorney, Agent, or Firm—Allen, Dyer, Doppelt, Milbrath & Gilchrist, P.A.

(57) ABSTRACT

A hexahedral finite element modeling method for controlling an element size, comprising the steps of: dividing a first face of a hexahedral finite element into four uniform sections, and dividing a second face diagonally opposite to the first face into sixteen uniform sections, thus modeling the hexahedral element into a face-refined transition unit mesh module; dividing a first edge of the hexahedral finite element having two meshed faces of the face-refined transition unit mesh module in common into two uniform sections, and dividing a second edge diagonally opposite to the first edge into four uniform sections, thus modeling the hexahedral element into a face-refined transition unit mesh module; and dividing each of three faces of the hexahedral finite element, having three meshed faces of the edge-refined transition unit mesh module in common and meeting each other at a first node, into four uniform sections, and partially dividing each of other three faces, meeting each other at a second node diagonally opposite to the first node, into four uniform sections, thus modeling the hexahedral element into a vertex-refined transition unit mesh module.

10 Claims, 10 Drawing Sheets

HEXAHEDRAL FINITE ELEMENT MODELING METHOD FOR CONTROLLING ELEMENT SIZE AND STORAGE MEDIUM THEREFOR

BACKGROUND OF THE INVENTION

1. Field of the Invention

The present invention relates to a finite element modeling method and a storage medium used in a process of finite element analysis and, more particularly, to a hexahedral finite element modeling method for controlling the element size and a storage medium used in the process of finite element analysis, the method and storage medium designed to more effectively model a hexahedral finite element by sequentially meshing the element into face-refined transition unit mesh module, edge-refined transition unit mesh module and vertex-refined transition unit mesh module.

2. Description of the Prior Art

A finite element method (FEM), which is one of the approximation numerical analyses of differential equations, has been preferably used in some engineering research fields, such as a mechanical engineering field, concentrating upon the mechanical analysis of a target system.

Such an FEM has been typically used in strength and strain analysis of a variety of machines and structures, fluid flow analysis, and electromagnetic field analysis. In order to perform an FEM for mechanically analyzing a target system, such as a machine or a structure, the problem domain of the target system is primarily divided into several sections having unit volumes. That is, the problem domain is divided into finite element meshes. In such a case, the problem domain is a target area of the system to be mechanically analyzed through the FEM.

Such a division of the problem domain into finite element meshes is so-called "a finite element modeling" in the field. The finite element modeling determines the accuracy in the prediction of the mechanical behavior of the target system.

The conventional FEM has been typically carried out through three steps: a pre-processor step, a solver step, and a post-processor step. Of the three steps, the solver step is a numerical calculation step.

At the pre-processor step, an ideal modeling process for a target system is performed while excluding the variables of environmental interest prior to sequentially performing a geometrical modeling process and a finite element modeling process.

In the finite element modeling process, it is necessary to primarily set the problem domain of a target system and divide the problem domain into several sections having a predetermined shape and various unit volumes, thus producing finite element meshes.

A finite element mesh consists of an element having a unit volume, and a plurality of nodes positioned at the vertexes of the element.

In the conventional FEM, the finite elements are classified into several types, for example, tetrahedral elements, hexahedral elements, pyramid elements, etc., in accordance with their shapes. Of the above-mentioned finite elements, the tetrahedral elements and hexahedral elements have been more preferably and frequently used in the FEM.

During a finite element analysis performed through the finite element modeling process, it is necessary to appropriately control the face density or node density of an element mesh in accordance with expected stress, deformation and strain generated in a target system in response to impact applied to the system.

That is, an area of the finite element, corresponding to an area of the target system expected to generate small calculation error during an engineering calculation process, is preferably divided into relatively larger meshes such that the meshed element has a low face density or low node density at the area. On the other hand, another area of the finite element, corresponding to an area of the target system expected to generate large calculation error during the engineering calculation process, is preferably divided into relatively smaller meshes such that the meshed element has a high face density or high node density. When the finite element is divided into meshes having different densities as described above, it is possible to get desired high precision of the FEM even if the FEM is carried out with the conventional computational complexity.

FIG. 1 is a flowchart of a hexahedral finite element modeling method according to the prior art. FIG. 2 is a perspective view of a hexahedral finite element mesh generated through the conventional hexahedral finite element modeling method.

As shown in the drawings, the conventional hexahedral finite element 1 has six faces, twelve edges and four nodes.

In the hexahedral finite element 1, it is necessary to reduce the face density and node density at an area of the element expected to generate small calculation error during a numerical calculation process as described above. Such an area is thus divided into relatively larger element meshes. In the conventional FEM, each of three faces of the finite element 1, having a first node in common, is divided into four uniform sections at step S10 of FIG. 1. Therefore, the face density and node density of the three faces are increased.

Thereafter, each of another three faces, commonly having a second node diagonally opposite to the first node, is divided into four uniform sections at step S20.

At step S30, each of the three faces, commonly having the second node and primarily divided into four sections at step S20, is secondarily divided into four uniform sections at a predetermined square area around the second node, and so the square areas are uniformly divided into twelve uniform faces concentrated at the second node diagonally opposite to the first node.

The square areas, having the uniformly divided twelve faces, are the areas of the finite element 1 expected to generate large calculation error during an engineering calculation process. Therefore, the areas are divided into relatively smaller meshes such that the meshed element 1 has a high face density and a high node density at said areas.

However, the conventional finite element modeling method is problematic as follows:

First, the conventional finite element modeling method is problematic in that it is almost impossible to accomplish desired complete connectivity between the densely meshed areas and sparsely meshed areas of a finite element during the process of modeling a target system in the form of hexahedral finite element by differentially meshing the element.

Second, even when the hexahedral finite element is differentially meshed in consideration of different calculation errors and different face and node densities caused by the errors, the difference in the face and node densities between the densely meshed and sparsely meshed areas of the element exceeds a reasonable limit. Therefore, the conventional finite element modeling method cannot accomplish a desired uniform size ratio of finite elements.

SUMMARY OF THE INVENTION

Accordingly, the present invention has been made keeping in mind the above problems occurring in the prior art, and an object of the present invention is to provide a hexahedral finite element modeling method capable of effectively controlling the element size and a storage medium used in the process of finite element analysis, which allows complete connectivity and smooth transition between the densely meshed and sparsely meshed areas of a hexahedral finite element.

Another object of the present invention is to provide a hexahedral finite element modeling method capable of effectively controlling the element size and a storage medium used in the process of finite element analysis, which is designed to more effectively model a hexahedral finite element by sequentially meshing the element into face-refined transition unit mesh module, edge-refined transition unit mesh module and vertex-refined transition unit mesh module.

In order to accomplish the above object, the present invention provides a hexahedral finite element modeling method for controlling an element size, comprising the steps of: dividing a first face of a hexahedral finite element into four uniform sections, and dividing a second face diagonally opposite to the first face into sixteen uniform sections, thus modeling the hexahedral element into a face-refined transition unit mesh module; dividing a first edge of the hexahedral finite element having two meshed faces of the face-refined transition unit mesh module in common into two uniform sections, and dividing a second edge diagonally opposite to the first edge into four uniform sections, thus modeling the hexahedral element into a face-refined transition unit mesh module; and dividing each of three faces of the hexahedral finite element, having three meshed faces of the edge-refined transition unit mesh module in common and meeting each other at a first node, into four uniform sections, and partially dividing each of other three faces, meeting each other at a second node diagonally opposite to the first node, into four uniform sections, thus modeling the hexahedral element into a vertex-refined transition unit mesh module.

In the hexahedral finite element modeling method, the face-refined transition unit mesh module accomplishes transition between the first face divided into four sections and the second face divided into sixteen sections.

In addition, the edge-refined transition unit mesh module accomplishes transition between the first edge divided into two sections and the second edge divided into four sections.

In addition, the vertex-refined transition unit mesh module accomplishes transition between the three faces meeting each other at the first node and each divided into four uniform sections, and the other three faces meeting each other at the second node and each partially divided into four uniform sections.

In order to accomplish the above object, the present invention also provides a storage medium of a hexahedral finite element modeling system, comprising: a first program code for dividing one face of a hexahedral finite element into four uniform sections, and dividing a diagonally opposite face into sixteen uniform sections, thus modeling the finite element into a face-refined transition unit mesh module; a second program code for modeling the hexahedral finite element into an edge-refined transition unit mesh module, which has two faces of the face-refined transition unit mesh module in common, and in which one edge of the finite element is divided into two uniform sections and a diagonally opposite edge is divided into four uniform sections; a third program code for modeling the hexahedral finite element into a vertex-refined transition unit mesh module, which has three faces of the edge-refined transition unit mesh module in common, and in which three faces meeting together at one node of the finite element are each divided into four uniform sections, and three faces meeting together at a diagonally opposite node are each partially divided into four uniform sections; a fourth program code for integrating the face-refined transition unit mesh module, edge-refined transition unit mesh module and vertex-refined transition unit mesh module into a single structure at their faces having the same meshed patterns; a fifth program code for displaying the structure of each of the face-refined transition unit mesh module, edge-refined transition unit mesh module and vertex-refined transition unit mesh module or the integrated structure of the element meshes in the form of a two- or three-dimensional image; a sixth program code for printing the structure of each of the face-refined transition unit mesh module, edge-refined transition unit mesh module and vertex-refined transition unit mesh module or the integrated structure of the element meshes, displayed in the form of the two- or three-dimensional image, on a paper, thus obtaining a printed image of the structure; a seventh program code for inputting, correcting and deleting a variety of numerical values of a target structure to be modeled into the face-refined transition unit mesh module, edge-refined transition unit mesh module and vertex-refined transition unit mesh module; and an eighth program code for storing data of the structure of the face-refined transition unit mesh module, edge-refined transition unit mesh module and vertex-refined transition unit mesh module.

The storage medium further comprises a program code for setting the display environment for the face-refined transition unit mesh module, edge-refined transition unit mesh module and vertex-refined transition unit mesh module, such as size and color of a viewer and environmental conditions of displayed letters.

The storage medium further comprises: a program code for displaying the structures of the face-refined transition unit mesh module, edge-refined transition unit mesh module and vertex-refined transition unit mesh module while rotating them in the form of a three-dimensional image; and a program code for providing optimal integration of the face-refined transition unit mesh module, edge-refined transition unit mesh module and vertex-refined transition unit mesh module through a rotation of the meshes in the form of the three-dimensional image.

The storage medium further comprises: a program code for differentially storing data of the structures of the face-refined transition unit mesh module, edge-refined transition unit mesh module and vertex-refined transition unit mesh module by contents, sub-contents and numerical values relative to the contents; a program code for allowing an operator to perform a search for the stored data about the structures of the face-refined transition unit mesh module, edge-refined transition unit mesh module and vertex-refined transition unit mesh module using keywords; a program code for displaying the search results and displaying whether the search results are the contents, sub-contents or numerical values relative to the contents or not; a program code for displaying search results corresponding to a designated one of the displayed search results; and a program code for storing the search results in the keyword list.

The storage medium further comprises: a program code for adding units to the stored numerical value data; a program code for converting the numerical value data in accordance with variable units; and a program code for distinguishing the physical force of the numerical value data from the units of the numerical value data.

The storage medium further comprises: a program code for displaying the keyword list in the case of input of an inappropriate keyword a predetermined number of times; and a program code for printing the search results on a paper.

DETAILED DESCRIPTION OF THE INVENTION

Figure 1:
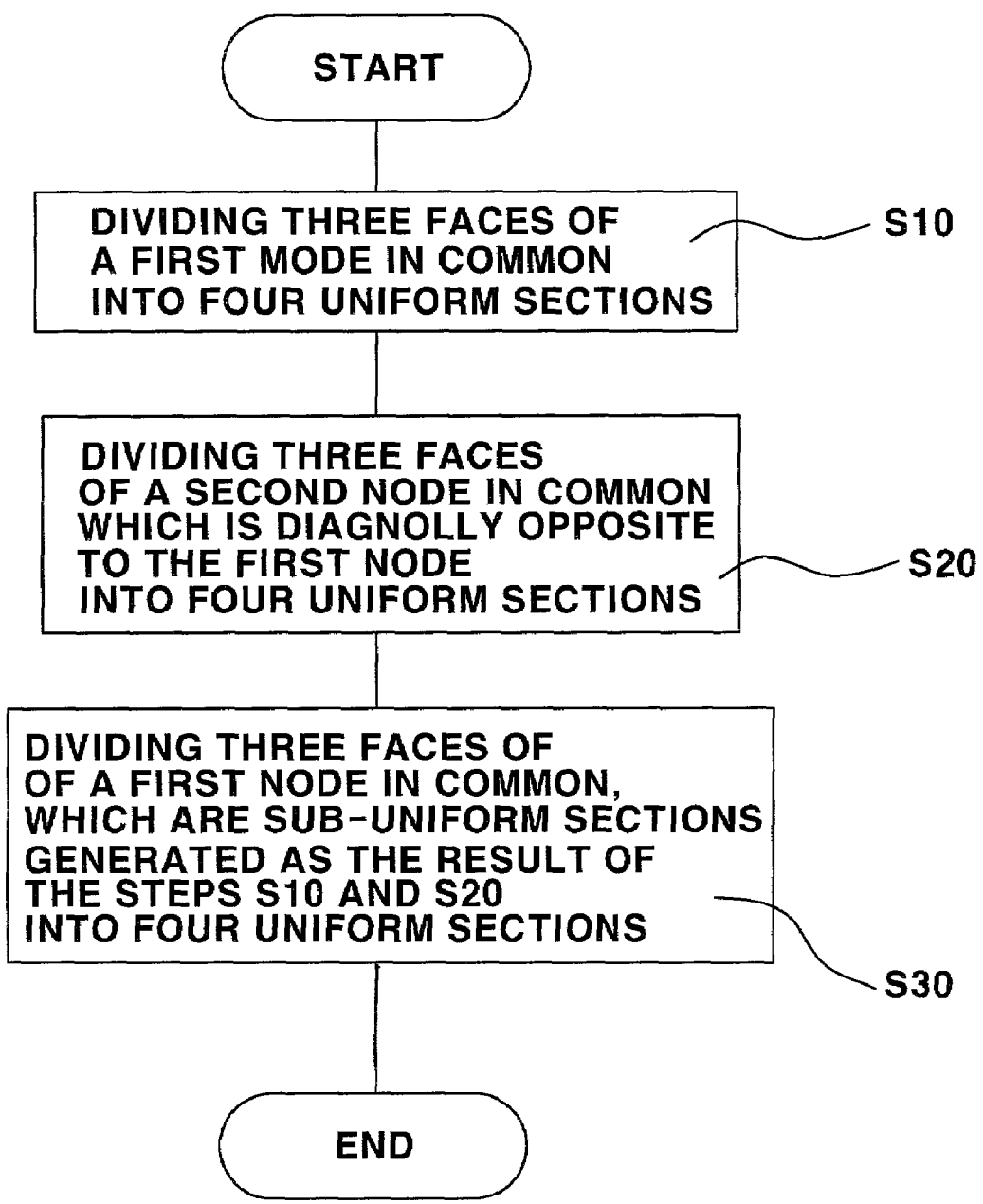
FIG. 1 is a flow diagram of a conventional hexahedral finite element modeling method.
Figure 2:
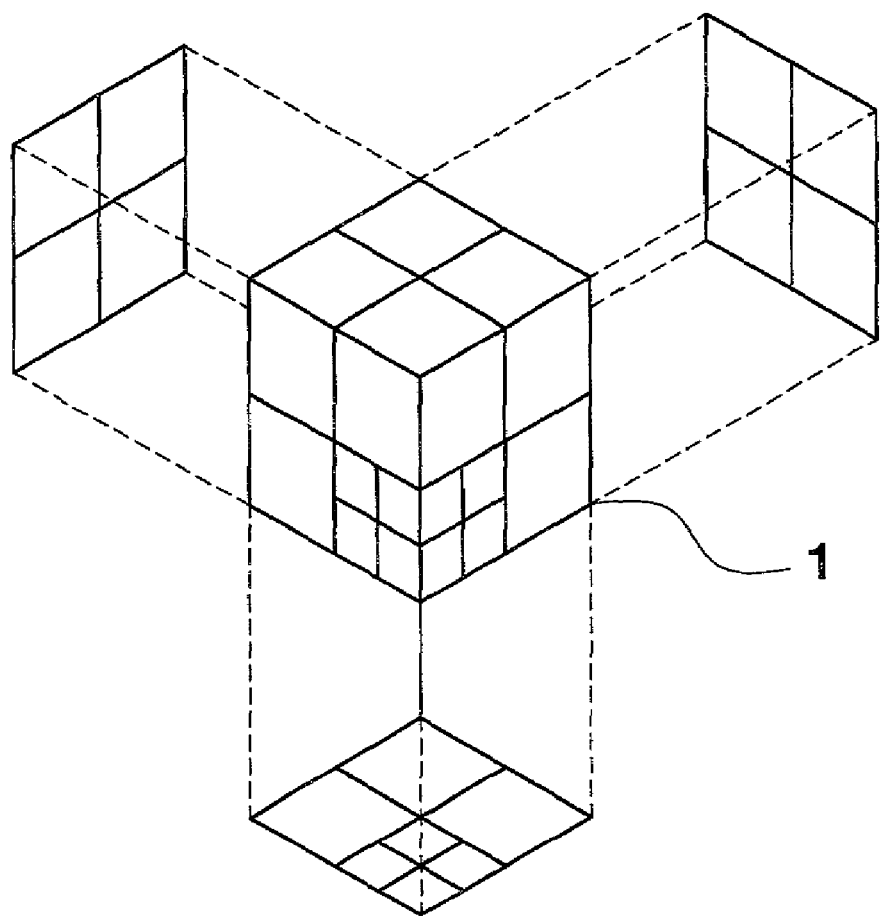
FIG. 2 is a perspective view of a hexahedral finite element mesh generated through the conventional hexahedral finite element modeling method.

In the present invention, the finite element meshes are "unit volumes formed by dividing the problem domain of a target system into several uniform sections having a predetermined shape during an engineering analysis of the target system". A finite element mesh consists of an element having a unit volume, and a plurality of nodes positioned at the vertexes of the element.

The finite element meshes are preferably used in the preprocessor step of FEM (finite element method). The FEM is for analyzing the behavior of a target system, and the pre-processor step is for modeling the target system into finite elements through an ideal modeling process and a geometrical modeling process. In the pre-processor step of FEM, the problem domain of a target system is modeled into three-dimensional finite elements, for example, tetrahedral elements, hexahedral elements or pyramid elements, which are effective in the engineering analysis of the target system.

In finite element modeling method of the present invention, a target system is modeled into hexahedral elements, which have been most preferably used in FEM.

In the present invention, the technical term "transition" means "continuous change from one state to another state". When a hexahedral finite element of this invention is densely meshed at one part and sparsely meshed at a diagonally opposite part while accomplishing desired smooth transition, the intermediate part of the two diagonally opposite parts accomplishes complete connectivity with the two diagonally opposite parts.

The present invention will be more clearly understood from the following detailed description taken in conjunction with the accompanying drawings, in which the same reference numerals are used throughout the different drawings to designate the same or similar components.

Figure 3:
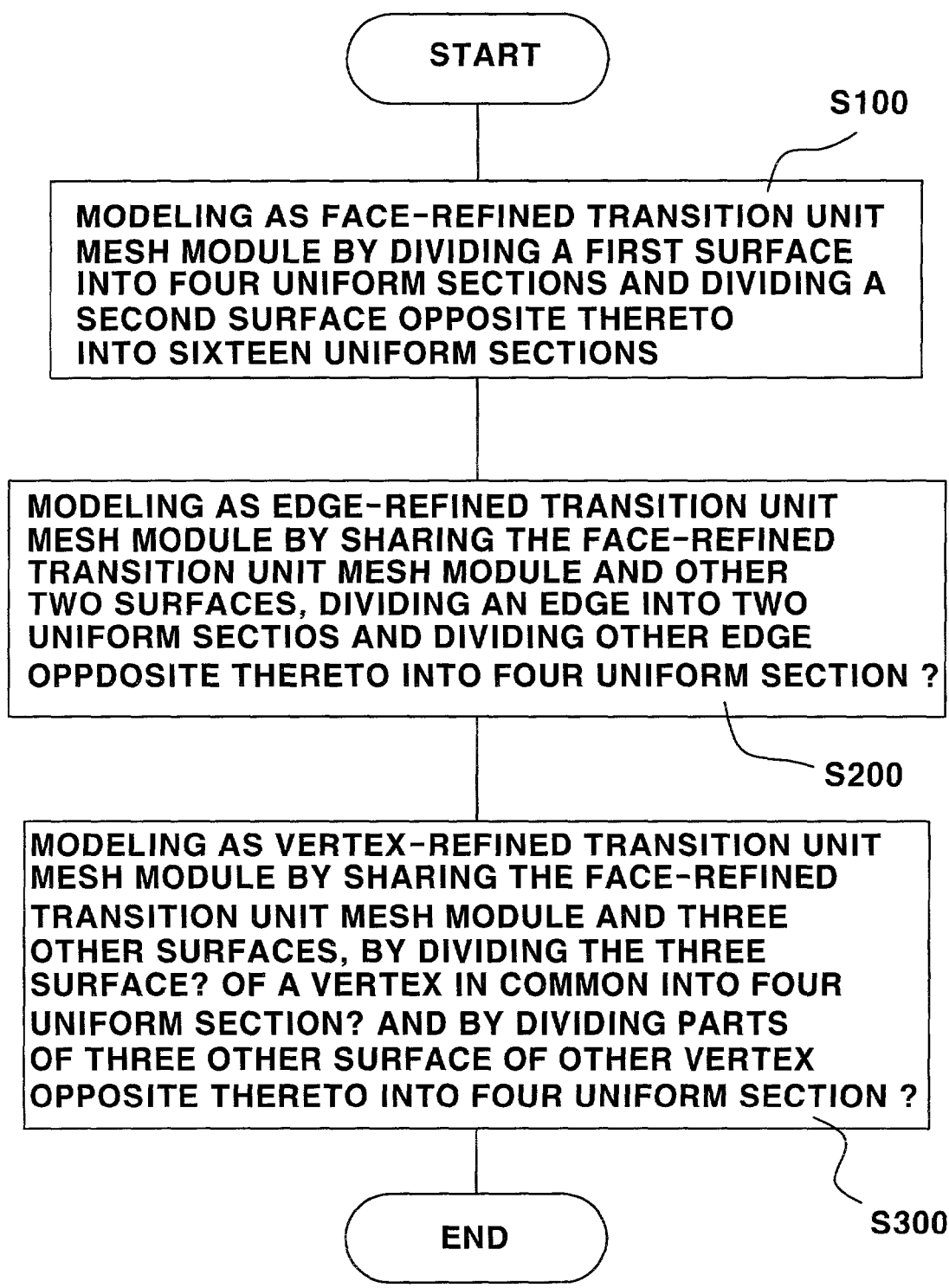
FIG. 3 is a flow diagram of a hexahedral finite element modeling method for effectively controlling the element size in accordance with the present invention.
Figure 4:
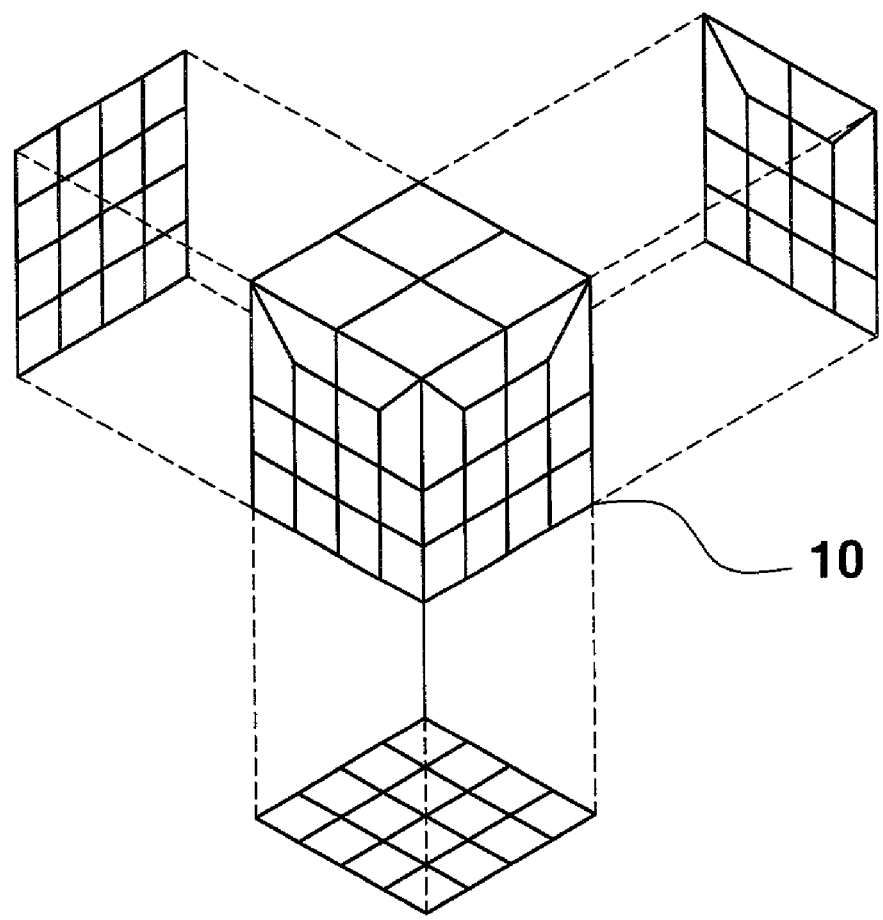
FIG. 4 is a perspective view of a face-refined transition unit mesh module generated in the finite element modeling method of the present invention.
Figure 5:
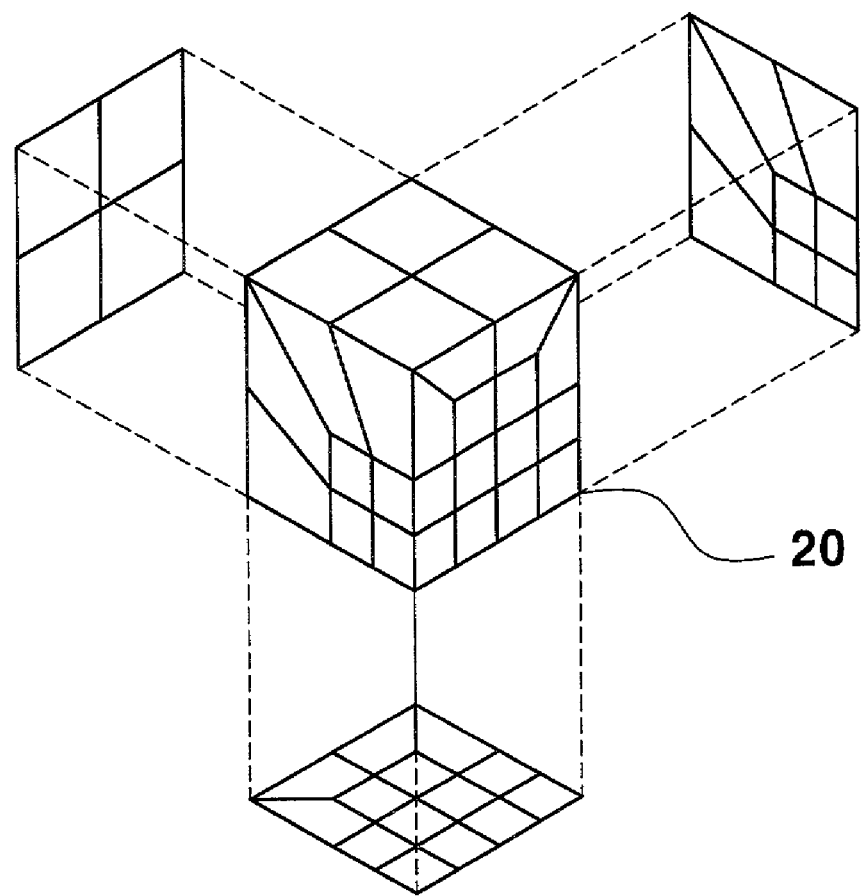
FIG. 5 is a perspective view of an edge-refined transition unit mesh module generated in the finite element modeling method of the present invention.
Figure 6:
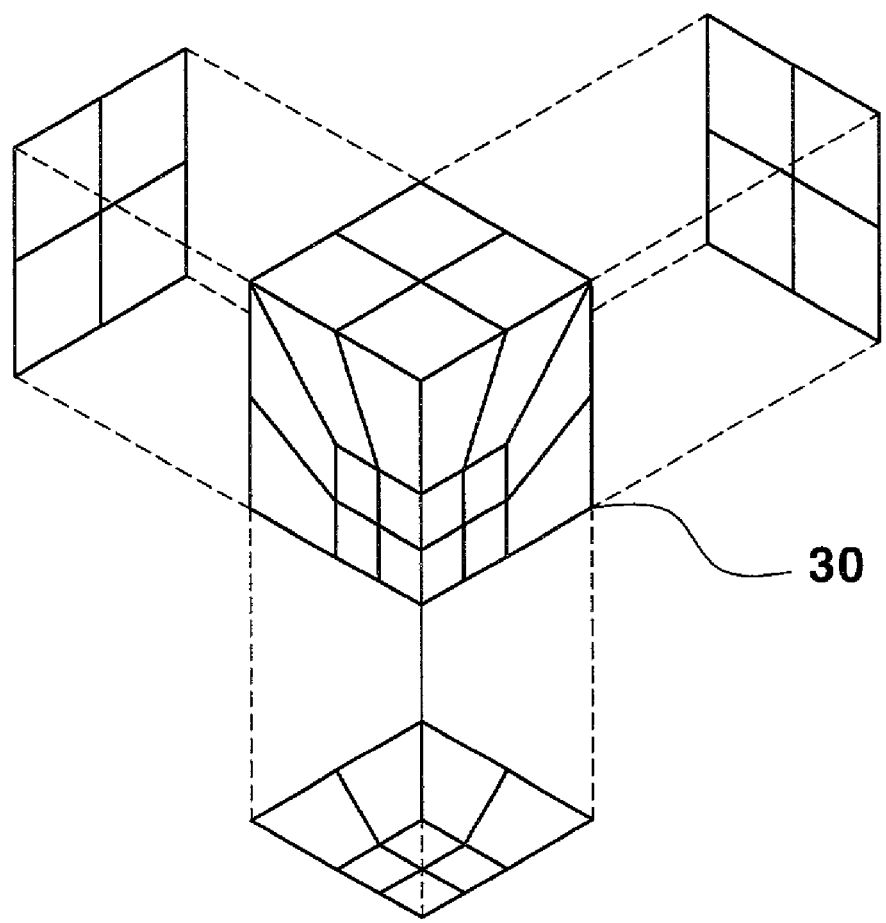
FIG. 6 is a perspective view of a vertex-refined transition unit mesh module generated in the finite element modeling method of the present invention.

FIG. 3 is a flow diagram of a hexahedral finite element modeling method for effectively controlling the element size in accordance with the present invention. FIG. 4 is a perspective view of a face-refined transition unit mesh module generated in the finite element modeling method of this invention. FIG. 5 is a perspective view of an edge-refined transition unit mesh module generated in the finite element modeling method of this invention. FIG. 6 is a perspective view of a vertex-refined transition unit mesh module generated in the finite element modeling method of this present invention.

As shown in the drawings, the conventional finite element modeling method of this invention is carried out through three steps: a pre-processor step, a solver step, and a post-processor step.

During the process of modeling a target system through the modeling method of this invention, it is possible to accomplish a high modeling accuracy by dividing an area of the element, expected to generate large error during an engineering calculation process, into relatively smaller meshes such that the meshed element has a high face density or high node density at the area, and dividing another area of the element, expected to generate small calculation error during the engineering calculation process, into relatively larger meshes such that the meshed element has a low face density or low node density at the area.

That is, the target system is primarily sectioned to produce a hexahedral finite element. Thereafter, the hexahedral finite element is modeled into a face-refined transition unit mesh module 10 at step S100. At this step S100, a first face of the hexahedral finite element, expected to generate small calculation error during an engineering calculation process, is divided into four uniform sections. In addition, a second face diagonally opposite to the first face is divided into sixteen uniform sections while accomplishing complete connectivity between the two faces. Therefore, the hexahedral element is modeled into a desired face-refined transition unit mesh module 10 with smooth transition between the two meshed faces.

The second face diagonally opposite to the first face is expected to generate large calculation error during the engineering calculation process.

Thereafter, the hexahedral finite element is modeled into an edge-refined transition unit mesh module 20 at step S200. At this step S200, a first edge of the hexahedral finite element, having two meshed faces of the face-refined transition unit mesh module 10 in common and expected to generate small calculation error during the engineering calculation process, is divided into two uniform sections. In addition, a second edge diagonally opposite to the first edge is divided into four uniform sections while accomplishing complete connectivity between the two edges.

The hexahedral element is modeled into a desired edge-refined transition unit mesh module 20 with smooth transition between the two meshed edges.

At next step S300, the hexahedral finite element is modeled into a vertex-refined transition unit mesh module 30. At this step S300, each of first three faces of the hexahedral finite element, having three meshed faces of the edge-refined transition unit mesh module 20 in common and meeting each other at a first node, is divided into four uniform sections. In addition, each of second three faces, meeting each other at a second node diagonally opposite to the first node, is partially divided into four uniform sections at an area around the second node. The areas of the second three faces around the second node are thus divided into twelve sections.

The areas of the first three faces around the first node are expected to generate small calculation error during the engineering calculation process, and so they are sparsely sectioned. However, the areas of the second three faces around the second node diagonally opposite to the first node are expected to generate large calculation error during the engineering calculation process, and so they are densely sectioned.

Even though the two types of areas are differently sectioned, desired complete connectivity between the two types of areas is accomplished and smooth transition is allowed between the diagonally opposite meshed areas.

In the face-refined transition unit mesh module 10, two of six faces of the hexahedral finite element correspond to those of the edge-refined transition unit mesh module 20 in their meshed patterns and sizes. The face-refined transition unit mesh module 10 is thus integrated with the edge-refined transition unit mesh module 20 at the two corresponding faces.

In the edge-refined transition unit mesh module 20, three of six faces of the hexahedral finite element correspond to those of the vertex-refined transition unit mesh module 30 in their meshed patterns and sizes. The edge-refined transition unit mesh module 20 is thus integrated with the vertex-refined transition unit mesh module 30 at the three corresponding faces.

Therefore, the face-refined transition unit mesh module 10, the edge-refined transition unit mesh module 20 and the vertex-refined transition unit mesh module 30 are integrated together into a hexahedral element mesh at their faces having the same meshed patterns and sizes while maintaining desired complete connectivity between the meshes.

In the face-refined transition unit mesh module 10, the top and bottom faces of the six faces of the hexahedral element are different from each other in their face-meshed patterns as shown in FIG. 3. That is, the top face of the hexahedral element is sparsely divided into four sections, while the bottom face is densely divided into sixteen sections. That is, the bottom face is primarily divided into four sections, and is secondarily divided into four sections at each of the primarily divided four sections, and so the bottom face is densely divided into sixteen sections.

In the face-refined transition unit mesh module 10, four side faces commonly having the eight edges of the top and bottom faces correspond to each other in their meshed patterns. Therefore, the side faces accomplish desired smooth transition between the top and bottom faces while maintaining desired complete connectivity between the top and bottom faces even though the top and bottom faces are different from each other in their face-meshed patterns.

In the edge-refined transition unit mesh module 20, two of six faces of hexahedral element have the same meshed pattern as that of the side faces of the face-refined transition unit mesh module 10 as shown in FIG. 5. That is, one of four side faces of the edge-mode meshed element and the bottom face having an edge of said side face in common have the same meshed pattern as that of the side faces of the face-refined transition unit mesh module 10.

In the edge-refined transition unit mesh module 20, two opposite side faces correspond to each other in their meshed patterns. The remaining one side face and the top face commonly having an edge of said side face have the same meshed pattern as that of the quadrisectioned top face of the face-refined transition unit mesh module 10. However, the side face and the top face of the edge-refined transition unit mesh module 20 are expected to generate small calculation error, and so they are not integrated with the face-refined transition unit mesh module 10, but are integrated with another sparsely meshed hexahedral elements.

The vertex-refined transition unit mesh module 30 and the edge-refined transition unit mesh module 20 have three faces in common. That is, three faces of the vertex-refined transition unit mesh module 30 correspond to two opposite side faces of the edge-refined transition unit mesh module 20 in their meshed patterns. Two of four side faces of the vertex-refined transition unit mesh module 30 having an edge in common and the bottom face meeting the two side faces at a first node correspond to the opposite two side faces of the edge-refined transition unit mesh module 20 in their meshed patterns.

The remaining faces of the vertex-refined transition unit mesh module 30 except for the above-mentioned three faces are each sparsely divided into four sections since they are expected to generate small calculation error in the numerical calculation process. That is, the top face of the vertex-refined transition unit mesh module 30 and two side faces commonly meeting the top face at a second node are sparsely meshed, and are integrated with other sparsely meshed hexahedral elements.

In such a case, the second node of the vertex-refined transition unit mesh module 30 is positioned diagonally opposite to the first node.

Figure 7:
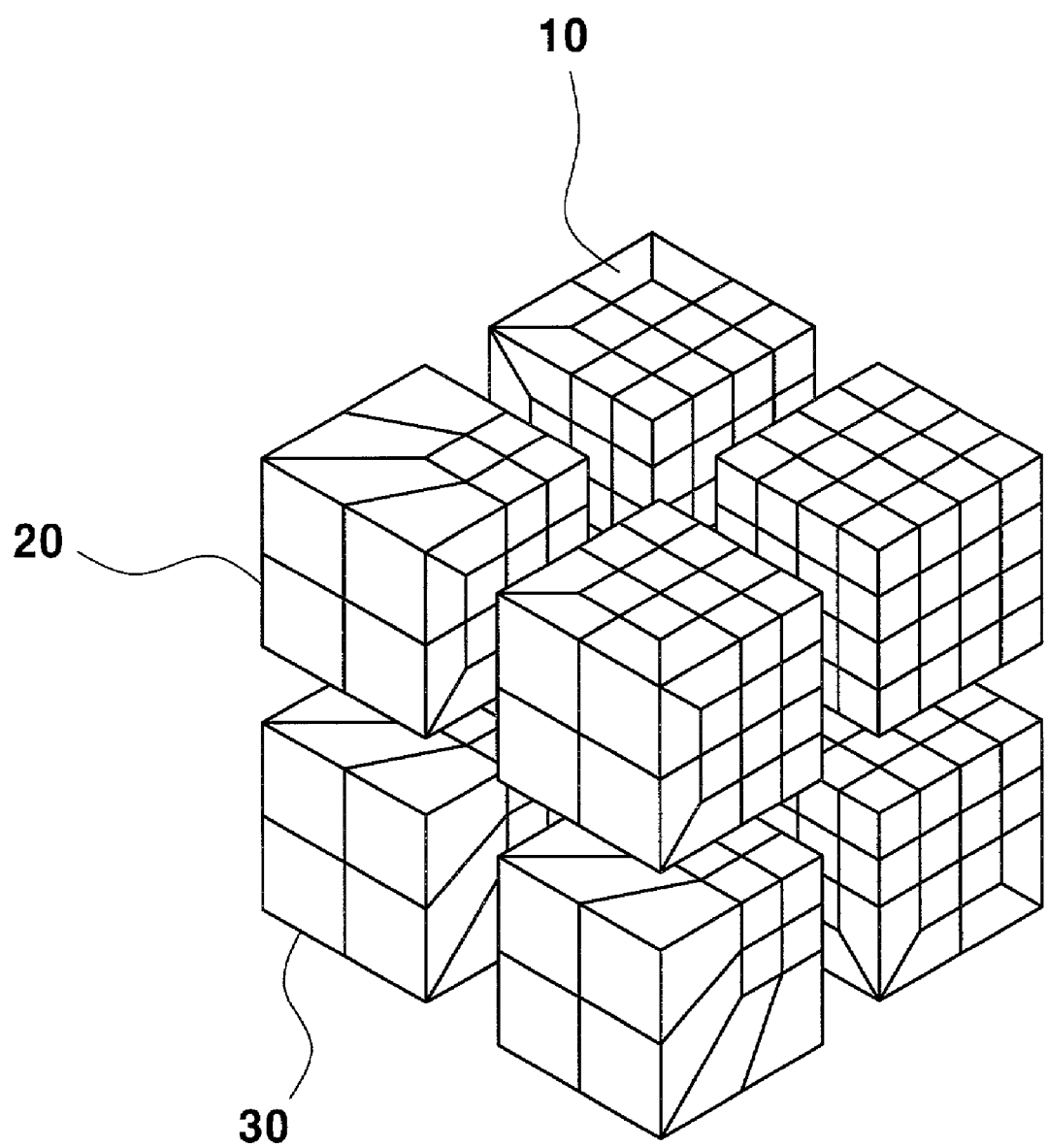
FIG. 7 is a view showing the structure of a hexahedral finite element meshed according to the finite element modeling method of the present invention.

FIG. 7 is a view showing the structure of a hexahedral finite element meshed according to the finite element modeling method of the present invention.

As shown in the drawing, the face-refined transition unit mesh modules 10, edge-refined transition unit mesh module 20 and vertex-refined transition unit mesh module 30 are integrated into a single hexahedral structure at corresponding faces thereof.

In addition to the above meshed elements, the six faces of another hexahedral element are each divided into sixteen sections, and are integrated with the faces of the face-mode meshed elements.

Therefore, the target system geometrically modeled into hexahedral finite elements are divided into sections expected to generate large calculation error and sections expected to generate small calculation error during an engineering calculation process.

In addition, the target system are geometrically modeled into face-mode meshed elements 10 meshed on the basis of sectioned faces, edge-mode meshed elements 20 meshed on the basis of sectioned edges and sectioned faces around the edges, and vertex-mode meshed elements 30 meshed on the basis of nodes at which sectioned faces meet other faces. Therefore, it is possible for the modeling method of this invention to obtain more precise mechanical analysis results through conventional engineering calculation processes.

Figure 8:
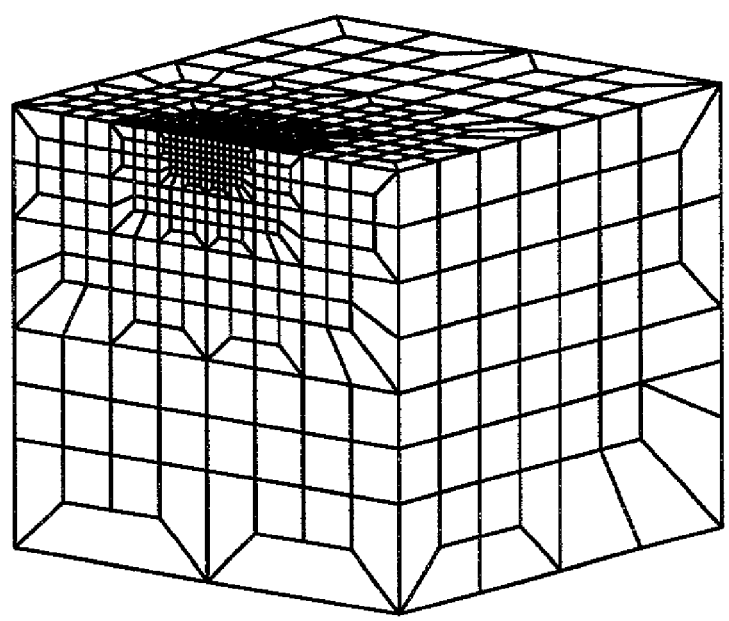
FIG. 8 is a view of the primary embodiment of a hexahedral finite element mesh generated through the finite element modeling method of the present invention.
Figure 9:
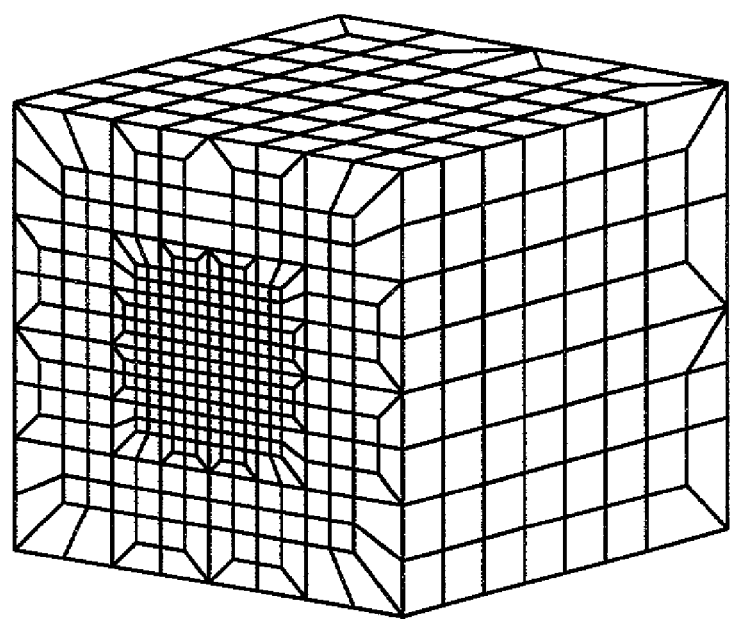
FIG. 9 is a view of the second embodiment of a hexahedral finite element mesh generated through the finite element modeling method of the present invention.
Figure 10:
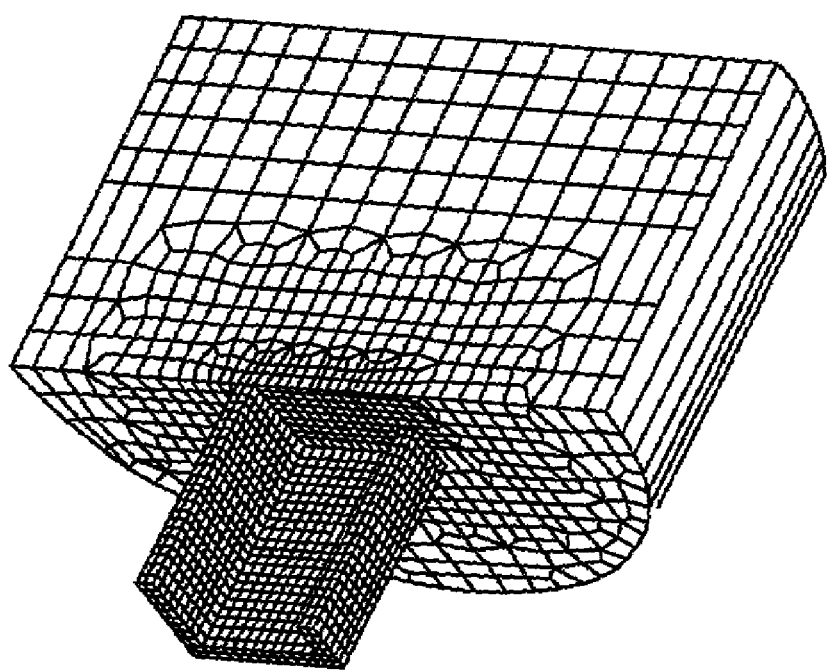
FIG. 10 is a view of the third embodiment of a hexahedral finite element mesh generated through the finite element modeling method of the present invention.

FIG. 8 is a view of the primary embodiment of a hexahedral finite element mesh generated through the finite element modeling method of the present invention. FIG. 9 is a view of the second embodiment of a hexahedral finite element mesh generated through the finite element modeling method of the present invention. FIG. 10 is a view of the third embodiment of a hexahedral finite element mesh generated through the finite element modeling method of the present invention.

As shown in FIGS. 8, 9 and 10, a target system is modeled into hexahedral finite elements at its problem domain. In such a case, an area of the finite element, corresponding to an area of the target system expected to generate large calculation error during an engineering calculation process, is divided into relatively smaller meshes such that the meshed element has a high face density or high node density at the area. On the other hand, another area of the finite element, corresponding to an area of the target system expected to generate small calculation error during the engineering calculation process, is divided into relatively larger meshes such that the meshed element has a low face density or low node density. It is thus possible to achieve desired high precision of the finite element modeling method even if the method is carried out with the conventional computational complexity.

In the finite element, the densely meshed area corresponds to an area of the target system, to which external force is concentratedly applied to cause deformation and which is thus expected to generate larger calculation error than the other areas during an engineering analysis.

In the finite element modeling method of this invention, the meshed finite element accomplishes desired connectivity between the sparsely meshed areas and densely meshed areas, and so it is possible to allow smooth transition between the sparsely and densely meshed areas of the element while maintaining the hexahedral shape of the element.

A storage medium, used in a hexahedral finite element modeling system according to this invention, will be described herein below.

Examples of the storage medium used in the hexahedral finite element modeling system of this invention are CD-ROM, DVD, hard disc, optical disc, floppy disc, and magnetic tape. The program codes, stored in the storage medium and performing the finite element modeling process of this invention through a computer system, consist of the following eight codes.

That is, the first program code is for sparsely dividing one face of a hexahedral finite element into four uniform sections, and densely dividing a diagonally opposite face into sixteen uniform sections, thus modeling the element into a face-refined transition unit mesh module 10.

The second program code is for modeling the element into an edge-refined transition unit mesh module 20, which has two faces of the face-refined transition unit mesh module 10 in common, and in which one edge of the hexahedral element is divided into two uniform sections and a diagonally opposite edge is divided into four uniform sections.

The third program code is for modeling the element into a vertex-refined transition unit mesh module 30, which has three faces of the edge-refined transition unit mesh module 20 in common, and in which three faces meeting together at one node of the hexahedral element are each divided into four uniform sections, and three faces meeting together at a diagonally opposite node are each partially divided into four uniform sections at an area around the node.

The fourth program code is for integrating the face-refined transition unit mesh module 10, edge-refined transition unit mesh module 20 and vertex-refined transition unit mesh module 30 into a single structure at their faces having the same meshed patterns.

The fifth program code is for displaying the structure of each of the face-refined transition unit mesh module 10, edge-refined transition unit mesh module 20 and vertex-refined transition unit mesh module 30 or the integrated structure of the element meshes in the form of a two- or three-dimensional image, thus allowing an operator to easily observe the modeling results.

The sixth program code is for printing the structure of each of the face-refined transition unit mesh module 10, edge-refined transition unit mesh module 20 and vertex-refined transition unit mesh module 30 or the integrated structure of the element meshes, displayed in the form of the two- or three-dimensional image, on a paper, thus obtaining a printed image of the structure.

The seventh program code is for inputting, correcting and deleting a variety of numerical values of a target structure to be modeled into the face-refined transition unit mesh module 10, edge-refined transition unit mesh module 20 and vertex-refined transition unit mesh module 30.

The eighth program code is for storing data of the structure of the face-refined transition unit mesh module 10, edge-refined transition unit mesh module 20 and vertex-refined transition unit mesh module 30.

In the present invention, another program code used for setting the display environment, such as size and color of a viewer and environmental conditions of displayed letters, may be added to the above-mentioned eight program codes. Such an addition of the program code to the eight program codes enhances the image displaying function of this invention.

In addition, a further program code used for displaying the structures of the face-refined transition unit mesh module 10, edge-refined transition unit mesh module 20 and vertex-refined transition unit mesh module 30 on a screen while rotating them in the form of a three-dimensional image may be added to the above-mentioned program codes. Still another program code used for providing optimal integration of the face-refined transition unit mesh module 10, edge-refined transition unit mesh module 20 and vertex-refined transition unit mesh module 30 may be added to the above-mentioned program codes. Due to the program codes, the operator easily observes the modeled structure.

In addition, still another program code used for differentially storing data of the structures of the face-refined transition unit mesh module 10, edge-refined transition unit mesh module 20 and vertex-refined transition unit mesh module 30 by contents, sub-contents and numerical values relative to the contents may be added to the above-mentioned program codes. In such a case, the data retrieval will be easily accomplished.

Still another program code for allowing an operator to perform a search for the stored data about the structures of the face-refined transition unit mesh module 10, edge-refined transition unit mesh module 20 and vertex-refined transition unit mesh module 30 using keywords may be added to the above-mentioned program codes. This additional program code allows an operator to easily search desired data using keywords.

The storage medium of this invention may be additionally stored with a program code for displaying the search results and displaying whether the search results are the contents, sub-contents or numerical values relative to the contents or not. Still another program code for displaying search results corresponding to a designated one of the displayed search results may be added to the above-mentioned program codes. Still another program code for storing the search results in the keyword list may be added to the above-mentioned program codes. Due to these program codes, it is possible to more easily display the search results.

The storage medium of this invention may be additionally stored with a program code for adding units to the stored numerical value data, and a program code for converting the numerical value data in accordance with variable units. It is thus possible to prevent any confusion in the use of units of numerical values. Such a function may be enhanced by a program code for distinguishing the physical force of the numerical value data from the units of the numerical value data.

In order to prevent inappropriate use of searching function, a program code for directly displaying the keyword list in the case of input of an inappropriate keyword a predetermined number of times may be added to the above-mentioned program codes.

Still another program code for printing the search results on a paper may be added to the above-mentioned program codes.

As described above, the present invention provides a hexahedral finite element modeling method for controlling the element size and a storage medium used in the process of finite element analysis. In the hexahedral finite element modeling method, it is possible to easily control the face and node density of the finite elements in accordance with the expected calculation error range. The hexahedral finite element modeling method of this invention thus more precisely analyzes expected stress, deformation and strain generated in a target system in response to impact applied to the system regardless of structural complexity of the system.

In the hexahedral finite element modeling method, it is possible to change the face density and node density of the hexahedral finite element as desired while accomplishing complete connectivity and smooth transition between parts with different densities, and so the size of the hexahedral finite element can be more easily controlled.

In addition, the options at the steps of the modeling process are coded for giving convenience to operators, and so it is possible to more easily model a target system into hexahedral finite elements. This modeling method and storage medium allow an operator to more easily and precisely observe and analyze the modeling process and modeling results, and so it is possible for reduce time and cost while modeling a target system into finite elements.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A hexahedral finite element modeling method for controlling an element size, comprising the steps of:

dividing a first face of a hexahedral finite element into four uniform sections, and dividing a second face diagonally opposite to the first face into sixteen uniform sections, thus modeling the hexahedral element into a face-refined transition unit mesh module;

dividing a first edge of the hexahedral finite element having two meshed faces of the face-refined transition unit mesh module in common into two uniform sections, and dividing a second edge diagonally opposite to the first edge into four uniform sections, thus modeling the hexahedral element into a face-refined transition unit mesh module; and dividing each of three faces of the hexahedral finite element, having three meshed faces of the edge-refined transition unit mesh module in common and meeting each other at a first node, into four uniform sections, and partially dividing each of other three faces, meeting each other at a second node diagonally opposite to the first node, into four uniform sections, thus modeling the hexahedral element into a vertex-refined transition unit mesh module.

2. The hexahedral finite element modeling method according to claim 1, wherein the face-refined transition unit mesh module accomplishes transition between the first face divided into four sections and the second face divided into sixteen sections.

3. The hexahedral finite element modeling method according to claim 1, wherein the edge-refined transition unit mesh module accomplishes transition between the first edge divided into two sections and the second edge divided into four sections.

4. The hexahedral finite element modeling method according to claim 1, wherein the vertex-refined transition unit mesh module accomplishes transition between the three faces meeting each other at the first node and each divided into four uniform sections, and the other three faces meeting each other at the second node and each partially divided into four uniform sections.

5. A storage medium of a hexahedral finite element modeling system, comprising:

a first program code for dividing one face of a hexahedral finite element into four uniform sections, and dividing a diagonally opposite face into sixteen uniform sections, thus modeling the finite element into a face-refined transition unit mesh module;

a second program code for modeling the hexahedral finite element into an edge-refined transition unit mesh module, which has two faces of the face-refined transition unit mesh module in common, and in which one edge of the finite element is divided into two uniform sections and a diagonally opposite edge is divided into four uniform sections;

a third program code for modeling the hexahedral finite element into a vertex-refined transition unit mesh module, which has three faces of the edge-refined transition unit mesh module in common, and in which three faces meeting together at one node of the finite element are each divided into four uniform sections, and three faces meeting together at a diagonally opposite node are each partially divided into four uniform sections;

a fourth program code for integrating the face-refined transition unit mesh module, edge-refined transition unit mesh module and vertex-refined transition unit mesh module into a single structure at their faces having the same meshed patterns;

a fifth program code for displaying the structure of each of the face-refined transition unit mesh module, edge-refined transition unit mesh module and vertex-refined transition unit mesh module or the integrated structure of the element meshes in the form of a two- or three-dimensional image;

a sixth program code for printing the structure of each of the face-refined transition unit mesh module, edge-refined transition unit mesh module and vertex-refined transition unit mesh module or the integrated structure of the element meshes, displayed in the form of the two- or three-dimensional image, on a paper, thus obtaining a printed image of the structure;

a seventh program code for inputting, correcting and deleting a variety of numerical values of a target structure to be modeled into the face-refined transition unit mesh module, edge-refined transition unit mesh module and vertex-refined transition unit mesh module; and an eighth program code for storing data of the structure of the face-refined transition unit mesh module, edge-refined transition unit mesh module and vertex-refined transition unit mesh module.

6. The storage medium according to claim 5, further comprising a program code for setting the display environment for the face-refined transition unit mesh module, edge-refined transition unit mesh module and vertex-refined transition unit mesh module, such as size and color of a viewer and environmental conditions of displayed letters.

7. The storage medium according to claim 5, further comprising:
- a program code for displaying the structures of the face-refined transition unit mesh module, edge-refined transition unit mesh module and vertex-refined transition unit mesh module while rotating them in the form of a three-dimensional image; and
- a program code for providing optimal integration of the face-refined transition unit mesh module, edge-refined transition unit mesh module and vertex-refined transition unit mesh module through a rotation of the meshes in the form of the three-dimensional image.

8. The storage medium according to claim 5, further comprising:
- a program code for differentially storing data of the structures of the face-refined transition unit mesh module, edge-refined transition unit mesh module and vertex-refined transition unit mesh module by contents, sub-contents and numerical values relative to the contents;
- a program code for allowing an operator to perform a search for the stored data about the structures of the face-refined transition unit mesh module, edge-refined transition unit mesh module and vertex-refined transition unit mesh module using keywords;
- a program code for displaying the search results and displaying whether the search results are the contents, sub-contents or numerical values relative to the contents or not;
- a program code for displaying search results corresponding to a designated one of the displayed search results; and
- a program code for storing the search results in the keyword list.

9. The storage medium according to claim 8, further comprising:
- a program code for adding units to the stored numerical value data;
- a program code for converting the numerical value data in accordance with variable units; and
- a program code for distinguishing the physical force of the numerical value data from the units of the numerical value data.

10. The storage medium according to claim 8, further comprising:
- a program code for displaying the keyword list in the case of input of an inappropriate keyword a predetermined number of times; and
- a program code for printing the search results on a paper.

* * * * *